United States Patent [19]

Nalesnik et al.

[11] Patent Number: 4,919,684
[45] Date of Patent: Apr. 24, 1990

[54] STABLE MIDDLE DISTILLATE FUEL-OIL COMPOSITIONS

[75] Inventors: Theodore E. Nalesnik, Beacon; Sheldon Herbstman, New City, both of N.Y.

[73] Assignee: Texaco Inc., White Plains, N.Y.

[21] Appl. No.: 288,206

[22] Filed: Dec. 22, 1988

[51] Int. Cl.$^5$ ................................................. C10L 1/22
[52] U.S. Cl. ............................................ 44/62; 44/63
[58] Field of Search ....................... 44/62; 252/51.5 A

[56] References Cited

U.S. PATENT DOCUMENTS 4,411,804 10/1983 DeVries et al. ................ 252/51.5 A
4,698,169 10/1987 Andress, Jr. et al. ......... 252/51.5 A
4,803,004 2/1989 Andress et al. ................ 252/51.5 A Primary Examiner—William R. Dixon, Jr.
Assistant Examiner—Rhonda R. Brown
Attorney, Agent, or Firm—Robert A. Kulason; James J. O'Loughlin; Vincent A. Mallare

[57] ABSTRACT

A stable middle distillate fuel-oil composition which comprises
(a) a major portion of a middle distillate fuel-oil; and
(b) a minor amount, as a storage stabilizing additive, of N-3-(3,5-di-t-butyl-5-hydroxybenzene)propyl succinimide of a copolymer and maleic anhydride graft.

5 Claims, No Drawings

STABLE MIDDLE DISTILLATE FUEL-OIL COMPOSITIONS

BACKGROUND OF THE INVENTION

This invention relates to middle distillate fuels and, more particularly, to a storage stabilizing additive for a middle distillate fuel-heating oil composition.

In the manufacture and production of middle distillate fuels and oils there is the problem of increased cracking of poorer quality crude oils. As a result, the commercially available diesel fuels and heating oils are less storage stable. Accordingly, stability additives are commonly introduced to prevent sludge formation and/or color change. However, to date these additives have not been effective or practical as to storage stabilizing middle distillates.

Thus, an object of the present invention is to provide a means of stabilizing efficiently a middle distillate, e.g., diesel fuels and heating oil, in storage.

DISCLOSURE STATEMENT

U.S. Pat. No. 4,089,794 discloses a process for preparing a lubricating oil concentrate of a VI improver having sludge dispersing properties wherein the VI improver is an ethylene copolymer with a number average molecular weight ranging from about 5,000 to 250,000 dissolved in a mineral lubricating oil.

U.S. Pat. No. 4,171,273 discloses a method of preparing fatty alkyl succinate ester and succinimide modified copolymers of ethylene and an alpha-olefin which are useful as shear stable viscosity index (VI) improvers, dispersants and pour point dispersants in lubricating oils.

U.S. Pat. No. 4,698,169 discloses additives useful in lubricant compositions having superior dispersant and antioxidant activity. The additives are products made by reacting (a) an alkenyl succinic compound with (b) an arylamine and (c) an alkanolamine or a hindered alcohol and borated reaction products thereof which provide dispersant and antioxidant activity to lubricant compositions.

SUMMARY OF THE INVENTION

This invention provides a stable middle distillate fuel-oil composition which comprises:
(a) a major portion of a middle distillate fuel-oil; and
(b) a minor amount of, as a storage stabilizing additive, a hydroxy aromatic or alkyl phenol polyamine succinimide of a copolymer and maleic anhydride graft of the formula

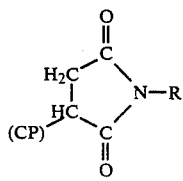

where (CP) is a copolymer and R is

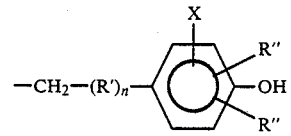

wherein R' is an alkyl, alkoxyl, alkylaryl or aryl group; X is SH, OH, OR' or H; and R" is H, an alkyl, an alkoxyl or an aryl group and n=0-6.

DETAILED DESCRIPTION OF THE INVENTION

In providing the present fuel-oil composition, i.e., a stable middle distillate, a storage stabilizing agent is added to the middle distillate fuel-oil.

According to the present invention, the stable middle distillate fuel oil composition comprises:
(a) a major portion of a middle distillate fuel-oil; and
(b) a minor amount of, as a storage stabilizing additive, hydroxy aromatic or alkyl phenol succinimide of a copolymer and maleic anhydride graft of the formula

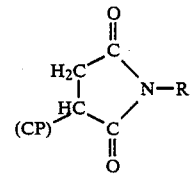

where (CP) is a copolymer and R is

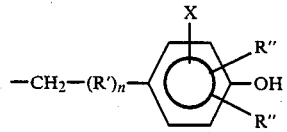

wherein R' is an alkyl, alkoxyl, alkylaryl or aryl group; X is SH, OH, OR' or H; and R" is H, an alkyl, an alkoxyl or an aryl group and n=0-6.

The polymer or copolymer substrate employed in the novel additive of the invention may be prepared from ethylene and propylene or it may be prepared from ethylene and a higher olefin within the range of $C_3$ to $C_{10}$ alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include, cyclic and bi-cyclo compounds. Representative dienes include 1,4-hexadiene, 1,4-cyclohexadiene, dicyclopentadiene, 5-ethylidene-2-norbornene, 5-methylene-2-norbornene, 1,5-heptadiene and 1,6-octadiene. A mixture of more one diene can be used in the preparation of the interpolymer. A preferred non-conjugated diene for preparing a terpolymer or interpolymer substrate is 1,4-hexadiene.

The triene component will have at least two non-conjugated double bonds and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydro-iso-dicyclopentadiene and 2-(2-methylene-4-methyl-3-pentenyl)-[2.21]bicyclo-5-heptene.

In the formulas above of the hydroxy aromatic amines, R includes those set forth below in Table 1.

TABLE 1

3-(3,5-di-t-butyl-4-hydroxybenzene)propyl amine 3-(3,5-di-t-butyl-4-hydroxybenzene)-2-methyl propylamine 3-(3,5-di-methyl-4-hydroxybenzene)propylamine 2-(3,5-di-t-butyl-4-hydroxybenzene)ethylamine The polymerization reaction to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Example of satisfactory hydrocarbon solvents include straight chain paraffins having from 5–8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40–45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha monoolefin copolymers may consist of from about 15 to 80 mole percent ethylene and from about 20 to 85 mole percent propylene or higher monoolefin with the preferred mole ratios being from about 25 to 75 mole percent ethylene and from about 25 to 75 mole percent of a ($C_3$ to $C_{10}$) alpha monoolefin with the most preferred proportions being from 25 to 55 mole percent ethylene and 45 to 75 mole percent propylene.

Terpolymer variations of the foregoing polymers may contain from about 0.1 to 10 mole percent of a non-conjugated diene or triene.

The polymer substrate, that is the ethylene copolymer or terpolymer, is an oil-soluble substantially linear, rubbery material having a number average molecular weight from about 5,000 to 500,000 with a preferred number avg. weight range of 25,000 to 250,000 and a most preferred range from about 50,000 to 150,000.

The terms polymer and copolymer are used generically to encompass ethylene copolymers, terpolymers or interpolymers. These materials may contain minor amounts of other olefinic monomers so long as their basic characteristics are not materially changed.

An ethylenically unsaturated carboxylic acid material is next grafted onto the prescribed polymer backbone. The materials which are attached to the polymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chlormaleic anhydride, itaconic anhydride or the corresponding dicarboxylic acids such as maleic acid, fumaric acid and their monoesters.

The ethylenically unsaturated carboxylic acid material may be grafted onto the polymer backbone in a number of ways. It may be grafted onto the backbone by a thermal process known as the "ene" process or by grafting in solution or in solid form using a radical initiator. The free-radical induced grafting of ethylenically unsaturated carboxylic acid materials in solvents such as benzene is a preferred method. It is carried out at an elevated temperature in the range of about 100° C. to 250° C., preferably 120° C. to 190° C. and more preferably at 150° C. to 180° C., e.g., above 160° C., in a solvent, preferably a mineral lubricating oil solution containing, e.g., 1 to 50, preferably 5 to 30 wt.%, based on the initial total oil solution, of the ethylene polymer and preferably under an inert environment.

The free-radical initiators which may be used are peroxides, hydroperoxides and azo compounds and, preferably, those which have a boiling point greater than about 100° C. and decompose thermally within the grafting temperature range to provide free radicals. Representative of these free-radical initiators are azobutyronitrile and 2,5-dimethyl-hex-3-yne-2,5 bis-tertiary-butyl peroxide. The initiator is used in an amount of between about 0.005% and about 1 wt.% based on the weight of the reaction mixture solution. The grafting is preferably carried out in an inert atmosphere, such as under nitrogen blanketing. The resulting polymer intermediate is characterized by having carboxylic acid acylating functions within its structure.

In the solid or melt process for forming a graft polymer, the unsaturated carboxylic acid with the optional use of a radical initiator is grafted on molten rubber using rubber masticating or shearing equipment. The temperature of the molten material in this process may range from about 150°–400° C.

Polymer substrates or interpolymers are available commercially. Particularly useful are those containing from bout 40 to about 60 mole percent ethylene units, about 60 to about 40 mole percent propylene units. Examples are "Ortholeum 2052" and "PL-1256" available from E.I. duPont deNemours and Co. The former is a terpolymer containing about 48 mole percent ethylene units, 48 mole percent propylene units and 4 mole percent, 1,4-hexadiene units, having an inherent viscosity of 1.35. The latter is a similar polymer with an inherent viscosity of 1.95. The viscosity number average molecular weights of the two are on the order of 200,000 and 280,000 respectively.

Specifically and, more preferably, the copolymer may consist of ethylene and a ($C_3$–$C_{18}$) alpha-monoolefin.

As an additive that is an efficient storage stabilizer for middle distillate fuel-heating oils, the polyethylene-propylene succinimide derived from 3-(3,5-di-t-butyl-4-hydroxybenzene)propylamine is the preferred additive. This has the formula

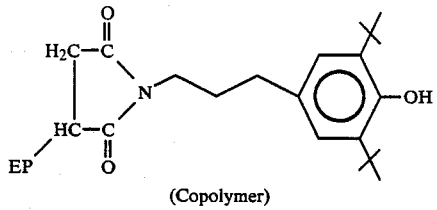

(Copolymer)

In determining the effectiveness of the stabilizer additive of the present invention, the preferred additive was compared with a commercially available dispersant stabilizer. The test performed is as discussed below.

METHOD OF TEST FOR POTENTIAL DEPOSIT TEST FOR MIDDLE DISTILLATE FUELS

Scope

1. This method describes a procedure for predicting the storage stability of middle distillate fuels based on the amount of insoluble material formed under accelerated oxidizing conditions. The method is intended for use with freshly produced fuels.

Outline of Method

2. The fuel sample is heated for two hours at 275° F. while air is being bubbled through the fuel at a rate of 3 liters per hour. At the end of the heating period the fuel is cooled at 77° F. for one hour and filtered through a 9.6 sq.cm. area of a No.1 Whatman filter paper. The density of the insoluble material deposited for the filter paper is visually compared to the deposit code which has been correlated with actual field test results.

Preparation of Ethylene Propylene (EP) Copolymer Derivative

[EP: Ethylene Propylene copolymer Number Average Mol. Wt. 80,000) MA graft level on EP is approximately 1.5 wt.%]

EXAMPLE I

Procedure

1. Dissolve 72 g of MA-EP in 528 g of SNO-100 base oil at 160° C. under $N_2$ blanket.
2. Stir 2 hours at 160° C. under $N_2$.
3. Add 3.5 g of 3-(3,5-di-t-butyl-4-hydroxybenzene) propylamine and react for 2 hours at 160° C. under $N_2$ (low flow rate).
4. Cool to 100° C. and screen filter (100 mesh) under $N_2$.

The results of the test are provided below in Table II.

TABLE II

| POTENTIAL DEPOSIT OXIDATION TEST* DATA FOR TWO H-OIL ADDITIZED DIESEL | Blend 1 | Blend 2 |
|---|---|---|
| Base Fuel | 5,5*** | 5,5 |
| 100 ppm of (1) above | | |
| 250 ppm (1) above | 1,3 | 2,2 |
| 500 ppm (1) above | 1,1 | 2,2 |
| 1000 ppm (1) above | 2,2 | 2,2 |

TABLE II-continued

| POTENTIAL DEPOSIT OXIDATION TEST* DATA FOR TWO H-OIL ADDITIZED DIESEL | Blend 1 | Blend 2 |
|---|---|---|
| Base Fuel** | | |
| 100 ppm of (1) above | | |
| 250 ppm of (1) above | 1,1 | 2,2 |
| 500 ppm of (1) above | 1,1 | 2,2 |
| 1000 ppm of (1) above | 1,1 | 2,2 |

*Oil heated at 275° F./2 hr with air bubbling through. The fuel sample is cooled and filtered. The color density of sediment on filter paper is measured. Results of 1–3 are considered good and results higher than 3 may show poor oxidation stability.
**H-Oil diesel.
***5,5 means 5 check 5 on separate tests.

The test results of Table I above indicate that additive stabilized the diesel fuel against heat and light-oxidation, both are equivalent in activity to commercially available additives (not shown).

It should be noted that the description presented herein is intended to be merely illustrative of the present invention and not limiting in any manner. The scope of the invention, therefore, is to be determined by the appended claims.

We claim:

1. A stable middle distillate fuel-oil composition comprising:
   (a) a major portion of a middle distillate fuel-oil; and
   (b) a minor amount of, as a storage stabilizing additive, a hydroxy aromatic or alkyl phenol succinimide of grafted onto a copolymer of the formula

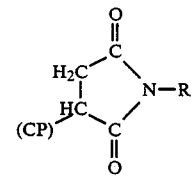

where (CP) is a copolymer of ethylene and a $(C_3-C_{18})$ alpha monoolefin, and R is

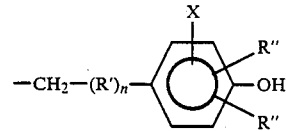

wherein R' is an alkyl, alkoxyl, alkylaryl or aryl group; X is a hydroxy aromatic amine SH, OH, OR, or H; and R" is H, alkyl, an alkoxyl or an aryl group and n=0-6.

2. The stable middle distillate fuel-oil composition of claim 1 wherein the copolymer consists of ethylene and a $(C_3-C_{18})$ alpha-monoolefin.

3. The stable middle distillate fuel-oil composition of claim 1 wherein the copolymer has a number avg. molecular weight ranging from about 5,000 to about 500,000.

4. The stable middle distillate fuel-oil composition of claim 1 wherein said composition is a diesel fuel/heating oil composition.

5. The stable middle distillate fuel-oil composition of claim 1 wherein said stabilizing additive is N-[3-(3,5-di-t-butyl-4-hydroxybenzene)]propyl succinimide bound onto an ethylene-propylene copolymer.

6. The stable middle distillate fuel-oil composition of claim 1 wherein said hydroxy aromatic amine is selected from the group consisting of 3-(3,5-di-t-butyl-4-hydroxybenzene)propyl amine, 3-(3,5-di-t-butyl-4-hydroxybenzene)-2-methyl propylamine, 3-(3,5-di-methyl-4-hydroxybenzene)propylamine and 2-(3,5-di-t-butyl-4-hydroxybenzene)ethylamine.

* * * * *